United States Patent
Yang et al.

(10) Patent No.: US 12,160,151 B2
(45) Date of Patent: Dec. 3, 2024

(54) ELECTRONIC DEVICE AND CONTROL METHOD

(71) Applicant: Richtek Technology Corporation, Zhubei (TW)

(72) Inventors: Tsung-Han Yang, Kaohsiung (TW); Yen-Chih Wang, New Taipei (TW); Ming-Jun Hsiao, Zhubei (TW); Tsung-Nan Wu, Zhubei (TW)

(73) Assignee: Richtek Technology Corporation, Hsinchu (TW)

( * ) Notice: Subject to any disclaimer, the term of this patent is extended or adjusted under 35 U.S.C. 154(b) by 156 days.

(21) Appl. No.: 17/512,896

(22) Filed: Oct. 28, 2021

(65) Prior Publication Data

US 2023/0090794 A1    Mar. 23, 2023

Related U.S. Application Data

(60) Provisional application No. 63/247,341, filed on Sep. 23, 2021.

(30) Foreign Application Priority Data

Oct. 8, 2021 (TW) .................. 110137472

(51) Int. Cl.
*H02P 25/034* (2016.01)
*H02K 33/04* (2006.01)
*H02P 6/00* (2016.01)
*H02P 25/06* (2016.01)

(52) U.S. Cl.
CPC ............. *H02K 33/04* (2013.01); *H02P 6/006* (2013.01); *H02P 25/06* (2013.01)

(58) Field of Classification Search
CPC .......... H02P 25/06; H02P 6/006; H02K 33/04
USPC ........................................................ 318/135
See application file for complete search history.

(56) References Cited

U.S. PATENT DOCUMENTS

| | | | |
|---|---|---|---|
| 2011/0056291 A1* | 3/2011 | Nakamura | G01C 19/5719 73/504.12 |
| 2011/0103097 A1* | 5/2011 | Wang | H02M 3/33592 363/21.02 |
| 2014/0013842 A1* | 1/2014 | Holliday | F16F 15/002 73/462 |
| 2017/0169674 A1 | 6/2017 | Macours | |
| 2018/0041173 A1 | 2/2018 | Marchais et al. | |
| 2018/0183372 A1* | 6/2018 | Li | G06F 3/016 |
| 2019/0294247 A1 | 9/2019 | Hu et al. | |
| 2020/0139403 A1* | 5/2020 | Palit | G05D 19/02 |
| 2020/0313529 A1 | 10/2020 | Lindemann et al. | |
| 2020/0313654 A1 | 10/2020 | Marchais et al. | |
| 2020/0389113 A1* | 12/2020 | Palit | H02P 25/06 |

(Continued)

*Primary Examiner* — Gabriel Agared
(74) *Attorney, Agent, or Firm* — Huan-Yi Lin

(57) ABSTRACT

An electronic device for controlling an LRA (Linear Resonant Actuator) includes a signal generator, a driver, a delay unit, a sensor, and a DSP (Digital Signal Processor). The signal generator generates a digital signal. The driver drives the LRA according to the digital signal. The delay unit delays the digital signal for a predetermined time, so as to generate an estimated voltage signal. The sensor detects the current flowing through the LRA, so as to generate a sensing current signal. The DSP controls the resonant frequency or the gain value of the signal generator according to the estimated voltage signal and the sensing current signal.

21 Claims, 7 Drawing Sheets

(56) References Cited

U.S. PATENT DOCUMENTS

| | | |
|---|---|---|
| 2020/0406296 A1 | 12/2020 | Stahl et al. |
| 2021/0126568 A1* | 4/2021 | Gautama ................. H02P 6/182 |
| 2021/0174777 A1 | 6/2021 | Marchais et al. |
| 2021/0281202 A1* | 9/2021 | Abdelfattah Aly ..... G06F 3/016 |

* cited by examiner

ELECTRONIC DEVICE AND CONTROL METHOD

CROSS REFERENCE TO RELATED APPLICATIONS

This application claims priority to U.S. Provisional Application Ser. No. 63/247,341, filed on Sep. 23, 2021, and also claims priority of Taiwan Patent Application No. 110137472 filed on Oct. 8, 2021, the entirety of which are incorporated by reference herein.

BACKGROUND OF THE INVENTION

Field of the Invention

The disclosure generally relates to an electronic device, and more specifically, to an electronic device for controlling an LRA (Linear Resonant Actuator).

Description of the Related Art

An LRA (Linear Resonant Actuator) can provide vibration feedback for a user. However, the Q value of the LRA is very large. If the operational frequency of the LRA deviates from its central resonant frequency, the operational performance of the LRA may be degraded. On the other hand, the central resonant frequency of the LRA may also shift due to the climate, humidity, and aging. Accordingly, there is a need to propose a novel solution for solving the problems of the prior art.

BRIEF SUMMARY OF THE INVENTION

In an exemplary embodiment, the invention is directed to an electronic device for controlling an LRA (Linear Resonant Actuator). The electronic device includes a signal generator, a driver, a delay unit, a sensor, and a DSP (Digital Signal Processor). The signal generator generates a digital signal. The driver drives the LRA according to the digital signal. The delay unit delays the digital signal for a predetermined time, so as to generate an estimated voltage signal. The sensor detects the current flowing through the LRA, so as to generate a sensing current signal. The DSP controls the resonant frequency or the gain value of the signal generator according to the estimated voltage signal and the sensing current signal.

In some embodiments, the DSP further detects a first phase relative to the estimated voltage signal and a second phase relative to the sensing current signal.

In some embodiments, the DSP further obtains the phase difference by subtracting the second phase from the first phase.

In some embodiments, the DSP further adjusts the resonant frequency of the signal generator according to the phase difference, such that the resonant frequency of the signal generator approaches the central resonant frequency of the LRA.

In some embodiments, if the phase difference is less than 0, the DSP will decrease the resonant frequency of the signal generator.

In some embodiments, if the phase difference is more than 0, the DSP will increase the resonant frequency of the signal generator.

In some embodiments, if the phase difference is equal to 0, the DSP will maintain the resonant frequency of the signal generator.

In some embodiments, the DSP includes an electromotive force module and a gain controller.

In some embodiments, the electromotive force module determines the back electromotive force of the LRA according to the digital signal, the estimated voltage signal, and the sensing current signal.

In some embodiments, the gain controller adjusts the gain value of the signal generator according to the back electromotive force of the LRA.

In another exemplary embodiment, the invention is directed to a control method for controlling an LRA (Linear Resonant Actuator). The control method the steps of: generating a digital signal via a signal generator; driving the LRA according to the digital signal; delaying the digital signal for a predetermined time, so as to generate an estimated voltage signal; detecting a current flowing through the LRA, so as to generate a sensing current signal; and controlling a resonant frequency or a gain value of the signal generator according to the estimated voltage signal and the sensing current signal.

In some embodiments, the control method further includes: detecting a first phase relative to the estimated voltage signal and a second phase relative to the sensing current signal.

In some embodiments, the control method further includes: obtaining the phase difference by subtracting the second phase from the first phase.

In some embodiments, the control method further includes: adjusting the resonant frequency of the signal generator according to the phase difference, such that the resonant frequency of the signal generator approaches the central resonant frequency of the LRA.

In some embodiments, the control method further includes: if the phase difference is less than 0, decreasing the resonant frequency of the signal generator.

In some embodiments, the control method further includes: if the phase difference is more than 0, increasing the resonant frequency of the signal generator.

In some embodiments, the control method further includes: if the phase difference is equal to 0, maintaining the resonant frequency of the signal generator.

In some embodiments, the control method further includes: determining the back electromotive force of the LRA according to the digital signal, the estimated voltage signal, and the sensing current signal.

In some embodiments, the control method further includes: adjusting the gain value of the signal generator according to the back electromotive force of the LRA.

In another exemplary embodiment, the invention is directed to an electronic device for controlling an LRA (Linear Resonant Actuator). The electronic device includes a signal generator, a mixer, a driver, a sensor, and a DSP (Digital Signal Processor). The signal generator generates a digital signal. The mixer generates a mixed signal according to the digital signal and a pilot signal. The driver drives the LRA according to the mixed signal. The sensor detects the current flowing through the LRA, so as to generate a sensing current signal. The DSP includes a low-pass filter. The low-pass filter processes the sensing current signal, so as to generate a low-frequency signal. The DSP controls the gain value of the signal generator according to the low-frequency signal.

In some embodiments, the DSP further includes a temperature estimator and a gain controller.

In some embodiments, the temperature estimator determines the current temperature of the LRA according to the low-frequency signal.

In some embodiments, the gain controller adjusts the gain value of the signal generator according to the current temperature of the LRA.

In some embodiments, if the current temperature of the LRA is higher than a threshold temperature, the gain controller will decrease the gain value of the signal generator.

In some embodiments, if the current temperature of the LRA is lower than or equal to the threshold temperature, the gain controller will maintain the gain value of the signal generator.

In another exemplary embodiment, the invention is directed to a control method for controlling an LRA (Linear Resonant Actuator). The control method includes the steps of: generating a digital signal via a signal generator; generating a mixed signal according to the digital signal and a pilot signal; driving the LRA according to the mixed signal; detecting a current flowing through the LRA, so as to generate a sensing current signal; processing the sensing current signal via a low-pass filter, so as to generate a low-frequency signal; and controlling a gain value of the signal generator according to the low-frequency signal.

In some embodiments, the control method further includes: determining the current temperature of the LRA according to the low-frequency signal.

In some embodiments, the control method further includes: adjusting the gain value of the signal generator according to the current temperature of the LRA.

In some embodiments, the control method further includes: if the current temperature of the LRA is higher than a threshold temperature, decreasing the gain value of the signal generator.

In some embodiments, the control method further includes: if the current temperature of the LRA is lower than or equal to the threshold temperature, maintaining the gain value of the signal generator.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
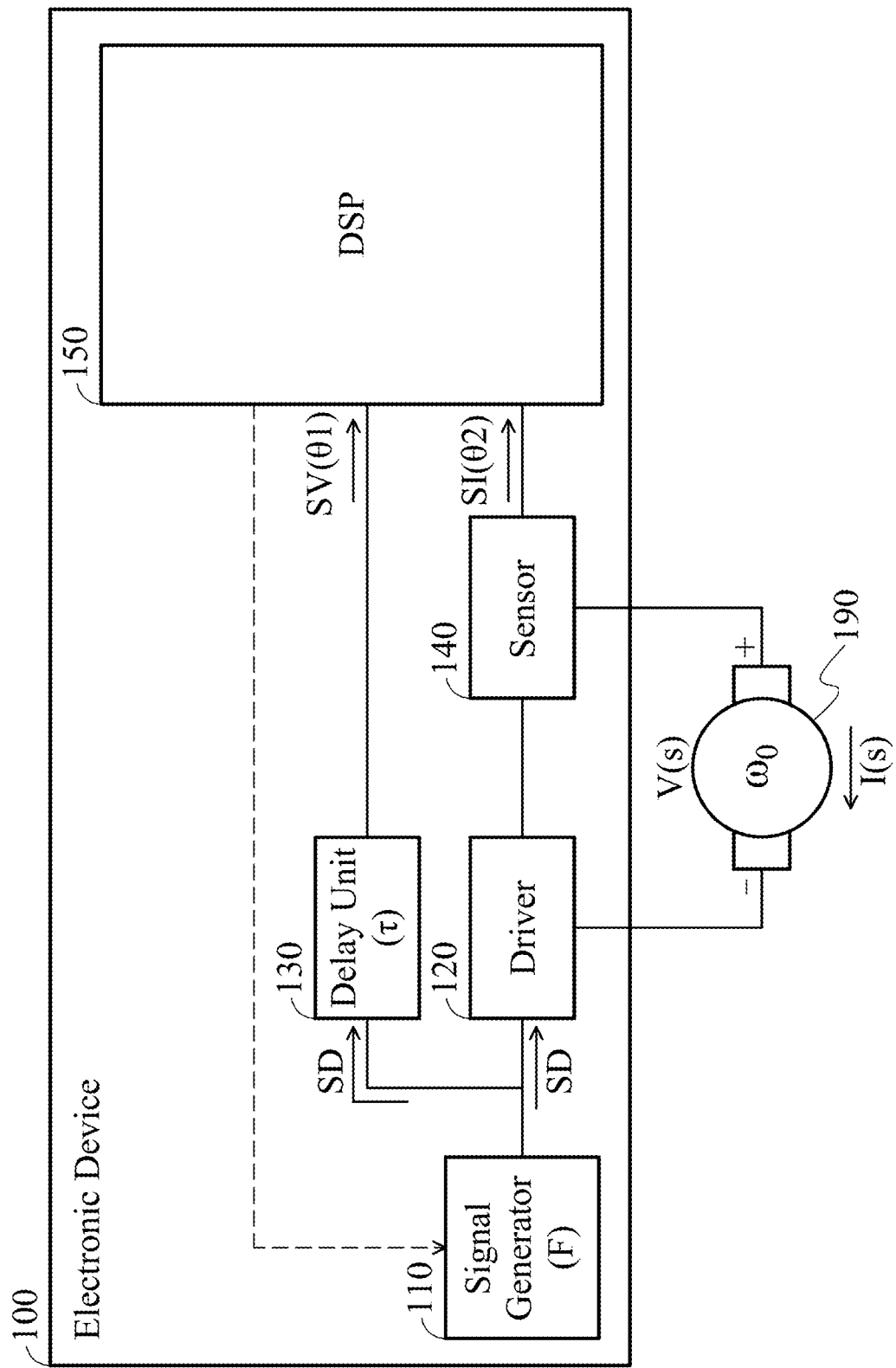
FIG. 1 is a diagram of an electronic device according to an embodiment of the invention.

FIG. 1 is a diagram of an electronic device 100 according to an embodiment of the invention. The electronic device 100 may be applied in a mobile device, such as a smart phone or a tablet computer. The electronic device 100 is configured to control an LRA (Linear Resonant Actuator) 190, which is not any part of the electronic device 100. As shown in FIG. 1, the electronic device 100 includes a signal generator 110, a driver 120, a delay unit 130, a sensor 140, and a DSP (Digital Signal Processor) 150. It should be noted that the electronic device 100 may include other components, such as a power supply module, a touch control module, a speaker, and/or a housing, although they are not displayed in FIG. 1. However, the invention is not limited thereto.

Generally, the signal generator 110 generates a digital signal SD. The driver 120 drives the LRA 190 according to the digital signal SD. The delay unit 130 delays the digital signal SD for a predetermined time τ, so as to generate an estimated voltage signal SV. The sensor 140 detects a current I(s) flowing through the LRA 190, so as to generate a sensing current signal SI. The DSP 150 controls the resonant frequency F of the signal generator 110 according to the estimated voltage signal SV and the sensing current signal SI.

The delay unit 130 simulates the delay caused by the driver 120. The predetermined time τ of the delay unit 130 may be set according to the operational characteristics of the driver 120 and the LRA 190. For example, the predetermined time τ may be calibrated before the electronic device 100 leaves the factory. In some embodiments, the estimated voltage signal SV corresponds the voltage difference V(s) between two terminals of the LRA 190, and the sensing current signal SI corresponds the current I(s) flowing through the LRA 190.

In some embodiments, the impedance model of the LRA 190 is described as the following equation (1):

$$Z(s) = \frac{V(s)}{I(s)} = \text{Re} \cdot \frac{\frac{s^2}{\omega_0^2} + \frac{s}{Q_{TS}\omega_0} + 1}{\frac{s^2}{\omega_0^2} + \frac{s}{Q_{MS}\omega_0} + 1} \quad (1)$$

where "Z(s)" represents the impedance value of the LRA 190, "V(s)" represents the voltage difference of the LRA 190, "I(s)" represents the current of the LRA 190, "Re" represents DC (Direct Current) impedance, "$\omega_0$" represents the central resonant frequency of the LRA 190, "$Q_{TS}$" represents a total quality factor, "QMs" represents a mechanical quality factor, and "s" represents a variable of Laplace transform.

In some embodiments, the DSP 150 detects a first phase θ1 relative to the estimated voltage signal SV, and a second phase θ2 relative to the sensing current signal SI. Next, the DSP 150 obtains a phase difference Δθ by subtracting the second phase θ2 from the first phase θ1 (i.e., Δθ=θ1−θ2). For example, the phase difference Δθ may correspond to the phase of the impedance value Z(s) of the LRA 190. Finally, the DSP 150 adjusts the resonant frequency F of the signal generator 110 according to the phase difference Δθ, such that the resonant frequency F of the signal generator 110 approaches the central resonant frequency $\omega_0$ of the LRA 190.

Figure 2:
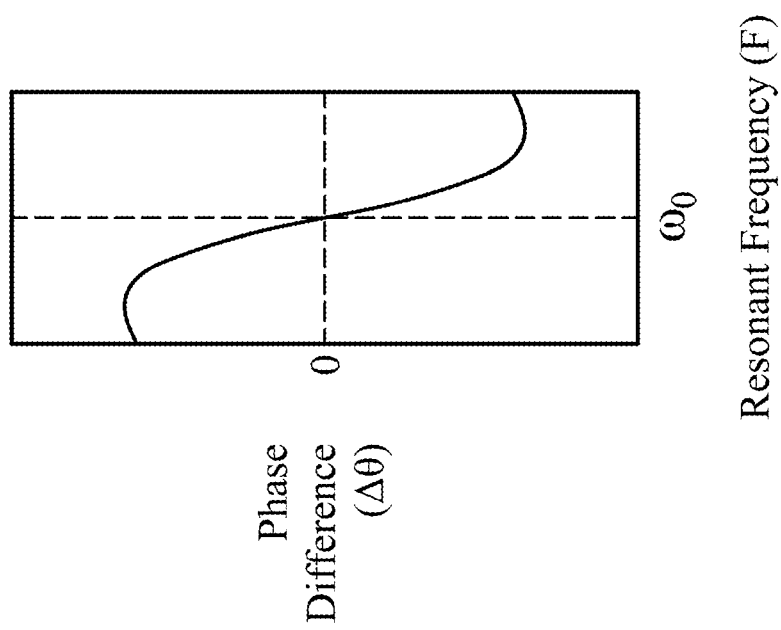
FIG. 2 is a diagram of relationship between a resonant frequency and a phase difference according to an embodiment of the invention.

FIG. 2 is a diagram of the relationship between the resonant frequency F and the phase difference Δθ according to an embodiment of the invention. Based on the equation (1) and the measurement of FIG. 2, if the resonant frequency F of the signal generator 110 is higher than the central resonant frequency $\omega_0$ of the LRA 190, the phase difference Δθ will be less than 0. If the resonant frequency F of the signal generator 110 is lower than the central resonant frequency wo of the LRA 190, the phase difference Δθ will be more than 0. If the resonant frequency F of the signal generator 110 is exactly equal to the central resonant frequency $\omega_0$ of the LRA 190, the phase difference Δθ will be exactly equal to 0.

In some embodiments, the DSP 150 will adjust the resonant frequency F of the signal generator 110 as follows, and therefore it can finally approach the central resonant frequency wo of the LRA 190. First, the DSP 150 can obtain the phase difference Δθ according to the estimated voltage signal SV and the sensing current signal SI. If the phase difference Δθ is more than 0, the DSP 150 can increase the resonant frequency F of the signal generator 110. Conversely, if the phase difference Δθ is less than 0, the DSP 150 can decrease the resonant frequency F of the signal generator 110. The DSP 150 can continuously adjust the resonant frequency F of the signal generator 110 until the phase difference Δθ is exactly equal to 0. At this time, the DSP 150 can maintain the resonant frequency F of the signal generator 110 at a constant value.

Figure 3:
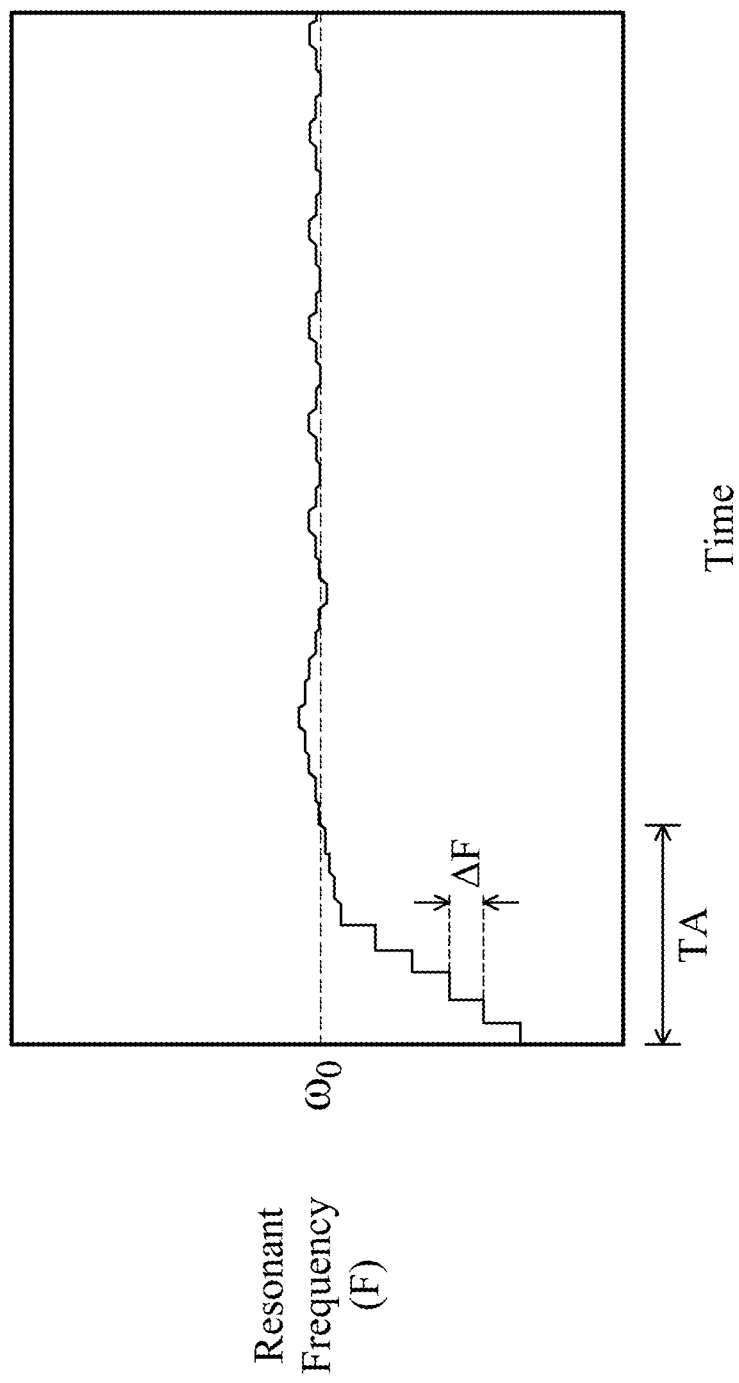
FIG. 3 is a diagram of relationship between a resonant frequency and time according to an embodiment of the invention.

FIG. 3 is a diagram of the relationship between the resonant frequency F and time according to an embodiment of the invention. Based on the measurement of FIG. 3, initially, the resonant frequency F of the signal generator 110 may be lower than the central resonant frequency $\omega_0$ of the LRA 190, and the phase difference Δθ may be more than 0. Thus, the DSP 150 can continuously increase the resonant frequency F of the signal generator 110 until zero-crossing occurs to the phase difference Δθ (e.g., the phase difference Δθ may be transferred from a positive value to a negative value, or may be transferred from a negative value to a positive value). Next, the aforementioned zero-crossing may occur several times, so as to guarantees that the phase difference Δθ is close to 0. In some embodiments, if the phase difference Δθ is more than a threshold phase (e.g., 0.5 or 1 degree(s), but it is not limited thereto), the DSP 150 can quickly adjust the resonant frequency F of the signal generator 110 by using a relatively large step ΔF. Conversely, if the phase difference Δθ is less than or equal to the threshold phase, the DSP 150 can slowly adjust the resonant frequency F of the signal generator 110 by using a relatively small step ΔF. In alternative embodiments, only within a preset time TA, the DSP 150 can quickly adjust the resonant frequency F of the signal generator 110 by using the relatively large step ΔF. Conversely, outside of the preset time TA, the DSP 150 can slowly adjust the resonant frequency F of the signal generator 110 by using the relatively small step ΔF.

With such a design, the proposed electronic device 100 can use the estimated voltage signal SV and the sensing current signal SI to guarantee that the resonant frequency F of the signal generator 110 is equal to the central resonant frequency $\omega_0$ of the LRA 190. Thus, the operational performance of the LRA 190 can be optimized. The following embodiments will introduce other configurations and functions of the electronic device 100. It should be understood that these figures and descriptions are merely exemplary, rather than limitations of the invention.

Figure 4:
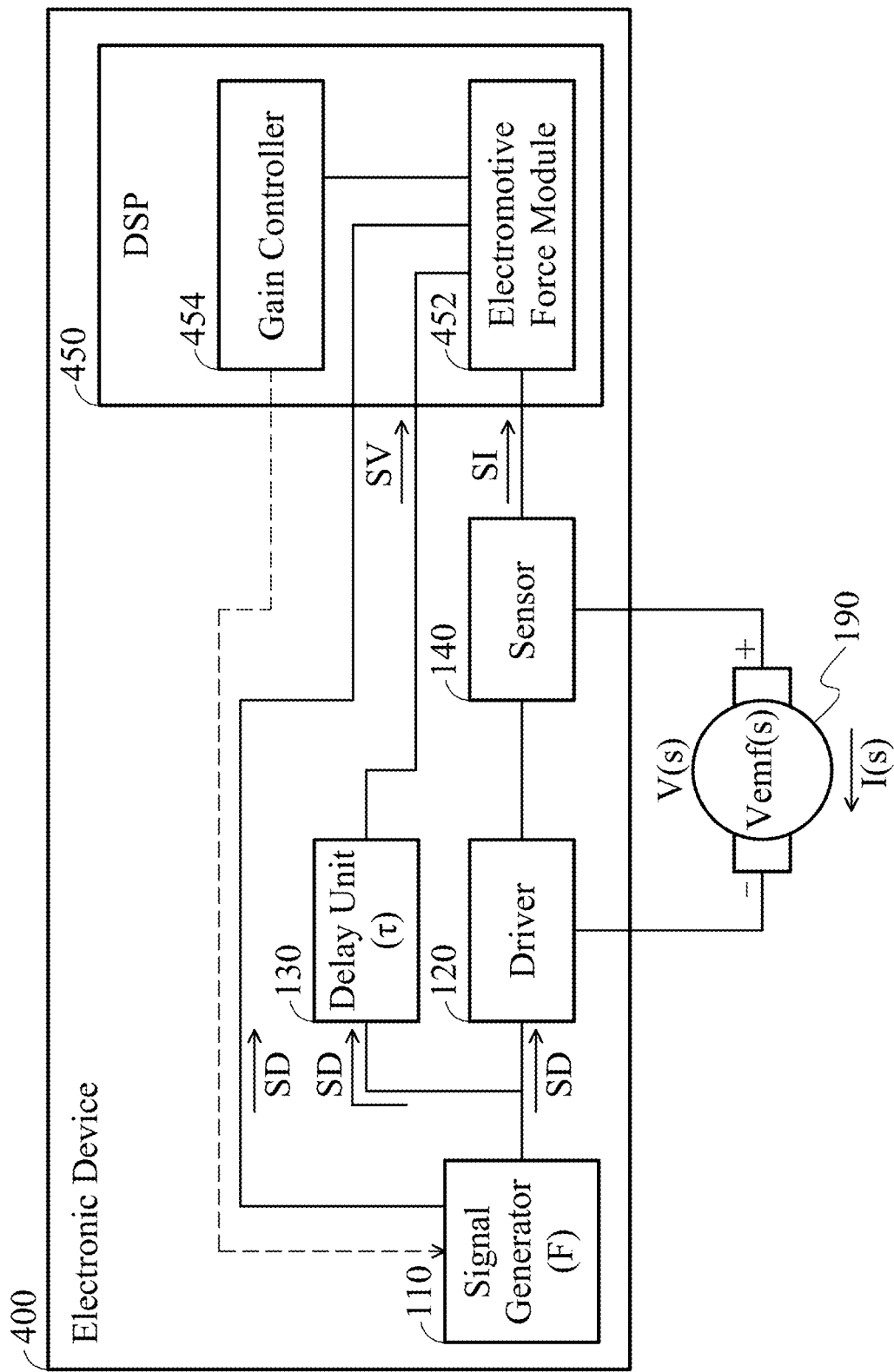
FIG. 4 is a diagram of an electronic device according to an embodiment of the invention.

FIG. 4 is a diagram of an electronic device 400 according to an embodiment of the invention. FIG. 4 is similar to FIG. 1. In the embodiment of FIG. 4, the electronic device 400 includes a signal generator 110, a driver 120, a delay unit 130, a sensor 140, and a DSP 450.

Generally, the signal generator 110 generates a digital signal SD. The driver 120 drives the LRA 190 according to the digital signal SD. The delay unit 130 delays the digital signal SD for a predetermined time τ, so as to generate an estimated voltage signal SV, which corresponds the voltage difference V(s) between the two terminals of the LRA 190. The sensor 140 detects a current I(s) flowing through the LRA 190, so as to generate a sensing current signal SI. The DSP 450 controls the gain value G of the signal generator 110 according to the estimated voltage signal SV and the sensing current signal SI.

In some embodiments, the DSP 450 includes an electromotive force module 452 and a gain controller 454. Specifically, the electromotive force module 452 determines a back electromotive force Vemf(s) of the LRA 190 according to the digital signal SD, the estimated voltage signal SV, and the sensing current signal SI. Next, the gain controller 454 adjusts the gain value G of the signal generator 110 according to the back electromotive force Vemf(s) of the LRA 190.

In some embodiments, the back electromotive force Vemf(s) of the LRA 190 is described as the following equation (2):

$$\text{Vemf}(s) = V(s) \times I(s) \cdot \text{Re} \qquad (2)$$

where "Vemf(s)" represents the back electromotive force of the LRA 190, "V(s)" represents the voltage difference of the LRA 190, "I(s)" represents the current of the LRA 190, "Re" represents DC impedance, and "s" represents a variable of Laplace transform.

It should be understood that the back electromotive force Vemf(s) of the LRA 190 is proportional to the moving speed of the LRA 190. For example, if the back electromotive force Vemf(s) is differentiated, the acceleration of the LRA 190 will be obtained. With such a design, the proposed electronic device 400 can estimate the vibration behavior of the LRA 190 according to the back electromotive force Vemf(s), so as to optimize the gain value G of the signal generator 110.

Figure 5:
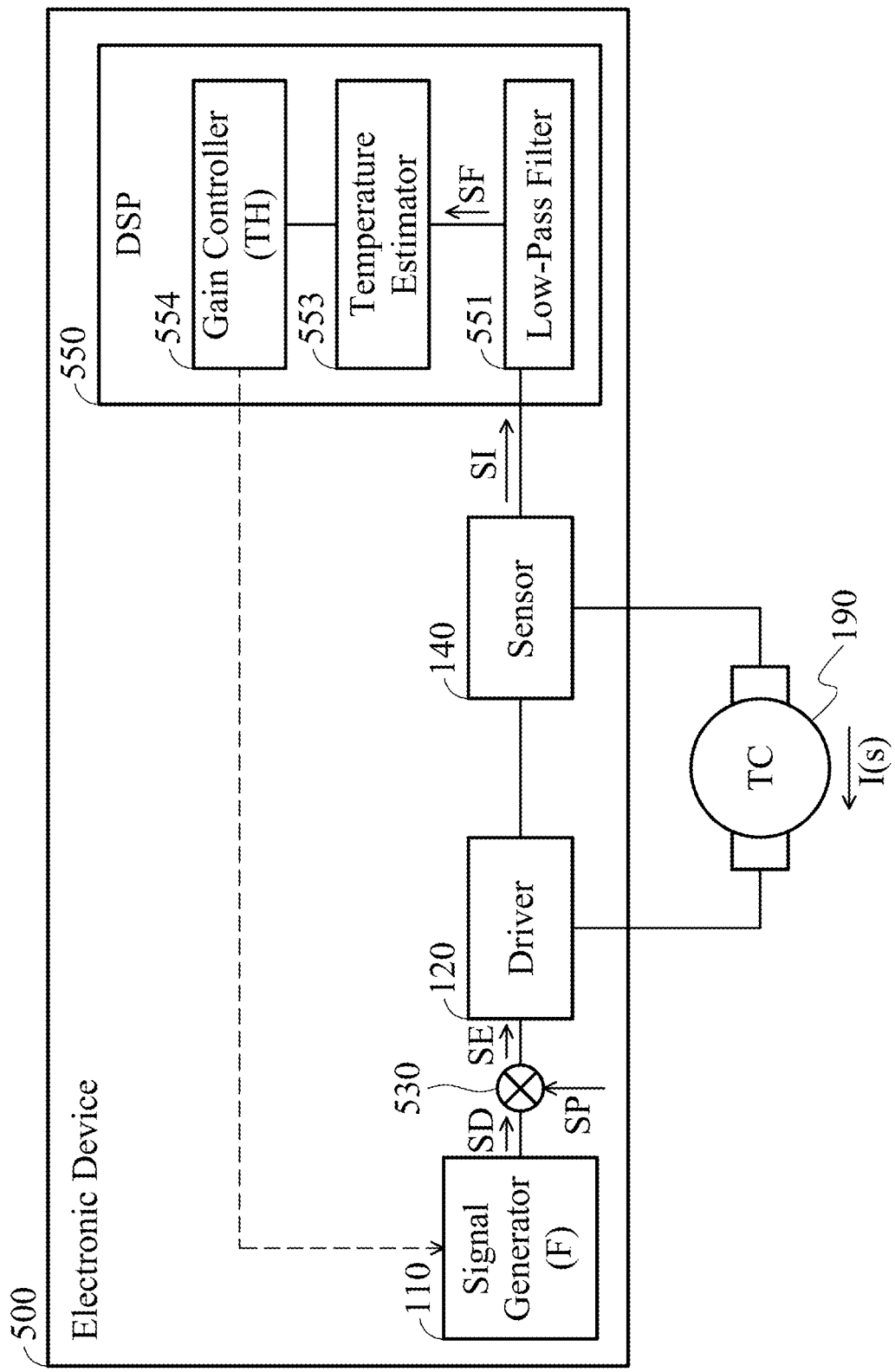
FIG. 5 is a diagram of an electronic device according to an embodiment of the invention.

FIG. 5 is a diagram of an electronic device 500 according to an embodiment of the invention. FIG. 5 is similar to FIG. 1. In the embodiment of FIG. 5, the electronic device 500 includes a signal generator 110, a driver 120, a mixer 530, a sensor 140, and a DSP 550. The DSP 550 at least includes a low-pass filter 551.

Generally, the signal generator 110 generates a digital signal SD. The mixer 530 generates a mixed signal SE according to the digital signal SD and a pilot signal SP. For example, the pilot signal SP may be a low-frequency small signal, which may come from a pilot signal generator (not shown). The driver 120 drives the LRA 190 according to the mixed signal SE. The sensor 140 detects a current I(s) flowing through the LRA 190, so as to generate a sensing current signal SI. The low-pass filter 551 processes the sensing current signal SI, so as to generate a low-frequency signal SF. The low-frequency signal SF may correspond to the aforementioned pilot signal SP. The DSP 550 controls the gain value G of the signal generator 110 according to the low-frequency signal SF.

In some embodiments, the DSP 550 further includes a temperature estimator 553 and a gain controller 554. Specifically, the temperature estimator 553 determines a current temperature TC of the LRA 190 according to the low-frequency signal SF. Next, the gain controller 554 adjusts the gain value G of the signal generator 110 according to the current temperature TC of the LRA 190. For example, if the current temperature TC of the LRA 190 is higher than a threshold temperature TH, the gain controller 554 may decrease the gain value G of the signal generator 110. Conversely, if the current temperature TC of the LRA 190 is lower than or equal to the threshold temperature TH, the gain controller 554 may maintain the gain value G of the signal generator 110 at a constant value.

It should be understood that if the current temperature TC of the LRA 190 is too high, the operational performance of the LRA 190 may be negatively affected. In order to overcome the drawback, the proposed electronic device 500 can optimize the gain value G of the signal generator 110 according to the current temperature TC of the LRA 190 using a negative feedback mechanism.

Figure 6:
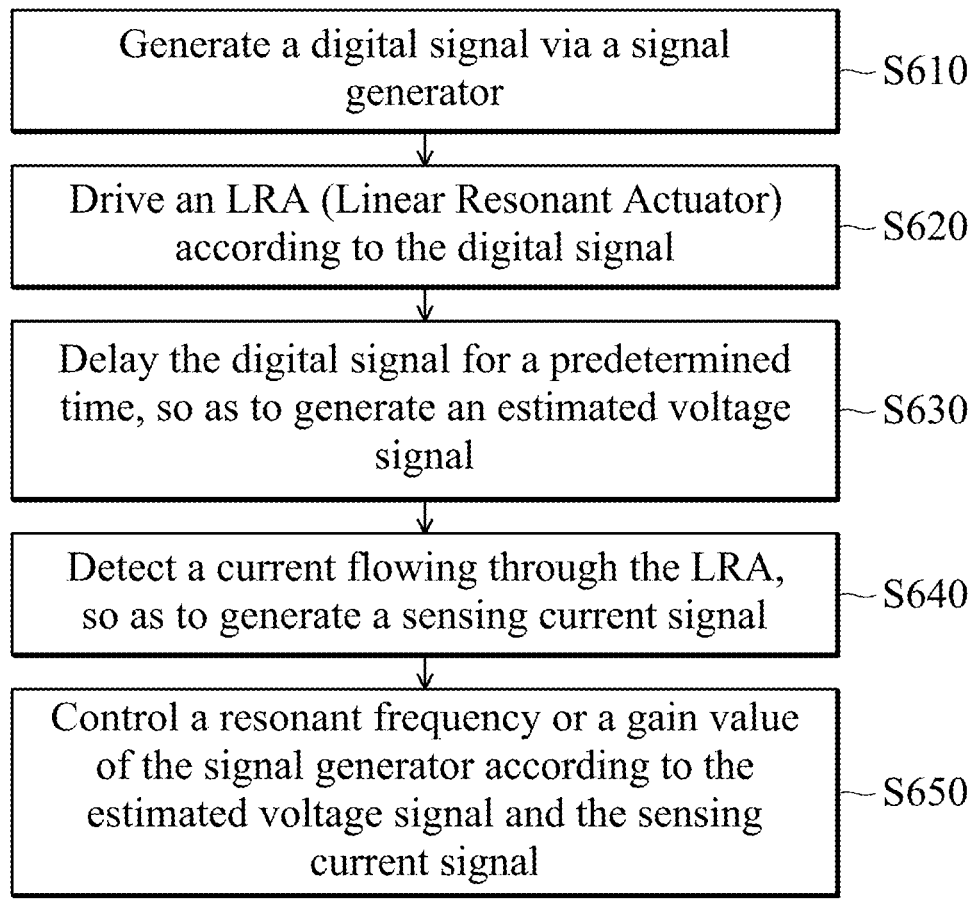
FIG. 6 is a flowchart of a control method according to an embodiment of the invention.

FIG. 6 is a flowchart of a control method according to an embodiment of the invention. The aforementioned control method includes the following steps. In step S610, a digital signal is generated via a signal generator. In step S620, an LRA is driven according to the digital signal. In step S630, the digital signal is delayed for a predetermined time, so as to generate an estimated voltage signal. In step S640, a current flowing through the LRA is detected, so as to generate a sensing current signal. In step S650, a resonant frequency or a gain value of the signal generator is controlled according to the estimated voltage signal and the sensing current signal. It should be understood that the above steps are not required to be performed in order, and all of the features of the embodiments of FIGS. 1 to 4 may be applied to the control method of FIG. 6.

Figure 7:
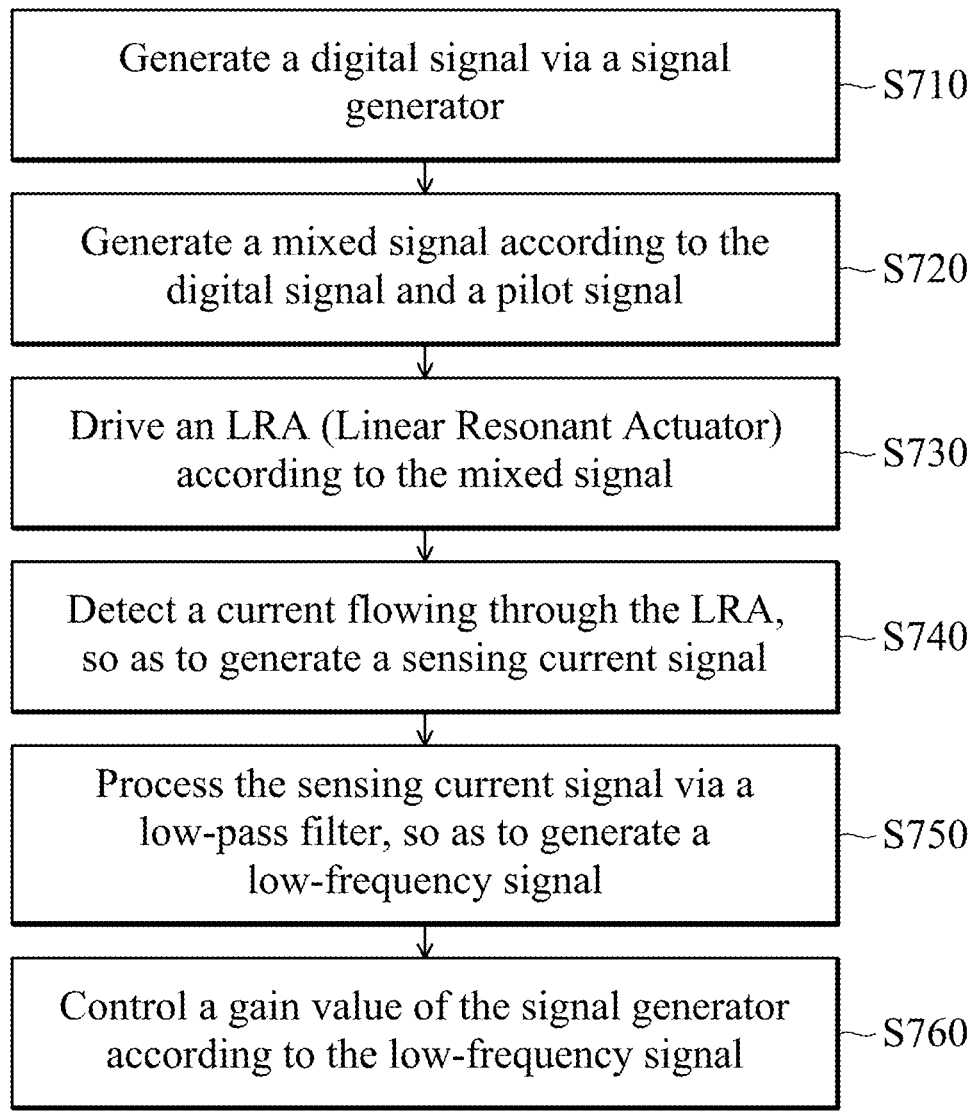
FIG. 7 is a flowchart of a control method according to an embodiment of the invention.

FIG. 7 is a flowchart of a control method according to an embodiment of the invention. The aforementioned control method includes the following steps. In step S710, a digital signal is generated via a signal generator. In step S720, a mixed signal is generated according to the digital signal and a pilot signal. In step S730, an LRA is driven according to the mixed signal. In step S740, a current flowing through the LRA is detected, so as to generate a sensing current signal. In step S750, the sensing current signal is processed via a low-pass filter, so as to generate a low-frequency signal. In step S760, a gain value of the signal generator is controlled according to the low-frequency signal. It should be understood that the above steps are not required to be performed in order, and all of the features of the embodiment of FIG. 5 may be applied to the control method of FIG. 7.

The invention proposes a novel electronic device configured to control an LRA and improve its operational performance. According to practical measurements, the electronic device using the above design provides very high stability, and it is almost not affected by the variations of the LRA. Therefore, the invention is suitable for application in a variety of mobile communication systems.

Note that the above voltages, currents, resistances, inductances, capacitances and other element parameters are not limitations of the invention. A designer can adjust these setting values according to different requirements. The electronic device and control method of the invention are not limited to the configurations of FIGS. 1-7. The invention may merely include any one or more features of any one or more embodiments of FIGS. 1-7. In other words, not all of the features displayed in the figures should be implemented in the electronic device and control method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. An electronic device for controlling an LRA (Linear Resonant Actuator), comprising:
    a signal generator, generating a digital signal, representing, in a digital format, an analog waveform having a resonant frequency for driving the LRA;
    a driver, converting the digital signal to generate a voltage difference between two terminals of the LRA for driving the LRA, wherein the voltage difference is correlated with the analog waveform and has a delay time, caused by the driver, relative to the digital signal;
    a delay unit, delaying the digital signal for a predetermined time, so as to generate an emulating voltage signal which emulates and represents the voltage difference between the two terminals of the LRA, wherein the predetermined time is related to and configured to compensate for the delay time;
    a sensor, detecting a current flowing through the LRA, so as to generate a sensing current signal, so as to adjust the digital signal; and
    a DSP (Digital Signal Processor), controlling a resonant frequency or a gain value of the signal generator according to the emulating voltage signal and the sensing current signal.

2. The electronic device as claimed in claim 1, wherein the DSP further detects a first phase relative to the emulating voltage signal and a second phase relative to the sensing current signal.

3. The electronic device as claimed in claim 2, wherein the DSP further obtains a phase difference by subtracting the second phase from the first phase.

4. The electronic device as claimed in claim 3, wherein the DSP further adjusts the resonant frequency of the signal generator according to the phase difference, such that the resonant frequency of the signal generator approaches a central resonant frequency of the LRA.

5. The electronic device as claimed in claim 3, wherein if the phase difference is less than 0, the DSP decreases the resonant frequency of the signal generator.

6. The electronic device as claimed in claim 3, wherein if the phase difference is more than 0, the DSP increases the resonant frequency of the signal generator.

7. The electronic device as claimed in claim 3, wherein if the phase difference is equal to 0, the DSP maintains the resonant frequency of the signal generator.

8. The electronic device as claimed in claim 1, wherein the DSP comprises an electromotive force module and a gain controller.

9. The electronic device as claimed in claim 8, wherein the electromotive force module determines a back electromotive force of the LRA according to the digital signal, the emulating voltage signal, and the sensing current signal.

10. The electronic device as claimed in claim 9, wherein the gain controller adjusts the gain value of the signal generator according to the back electromotive force of the LRA.

11. The electronic device as claimed in claim 1, wherein the predetermined time is independent of to the resonant frequency and/or is calibrated to be fixed before the electronic device leaves the factory.

12. A control method for controlling an LRA (Linear Resonant Actuator), comprising the steps of:
generating a digital signal via a signal generator, the digital signal representing, in a digital format, an analog waveform having a resonant frequency for driving the LRA;
converting the digital signal to generate a voltage difference between two terminals of the LRA for driving the LRA according to the digital signal, wherein the voltage difference is correlated with the analog waveform and has a delay time, caused by the driver, relative to the digital signal;
delaying the digital signal for a predetermined time, so as to generate an emulating voltage signal which emulates and represents the voltage difference between the two terminals of the LRA, wherein the predetermined time is related to and configured to compensate for the delay time;
detecting a current flowing through the LRA, so as to generate a sensing current signal; and
controlling a resonant frequency or a gain value of the signal generator according to the emulating voltage signal and the sensing current signal, so as to adjust the digital signal.

13. The control method as claimed in claim 12, wherein the predetermined time is independent of to the resonant frequency and/or is calibrated to be fixed before the electronic device leaves the factory.

14. The control method as claimed in claim 12, further comprising:
detecting a first phase relative to the emulating voltage signal and a second phase relative to the sensing current signal.

15. The control method as claimed in claim 14, further comprising:
obtaining a phase difference by subtracting the second phase form the first phase.

16. The control method as claimed in claim 15, further comprising:
adjusting the resonant frequency of the signal generator according to the phase difference, such that the resonant frequency of the signal generator approaches a central resonant frequency of the LRA.

17. The control method as claimed in claim 15, further comprising:
if the phase difference is less than 0, decreasing the resonant frequency of the signal generator.

18. The control method as claimed in claim 15, further comprising:
if the phase difference is more than 0, increasing the resonant frequency of the signal generator.

19. The control method as claimed in claim 15, further comprising:
if the phase difference is equal to 0, maintaining the resonant frequency of the signal generator.

20. The control method as claimed in claim 15, further comprising:
determining a back electromotive force of the LRA according to the digital signal, the emulating voltage signal, and the sensing current signal.

21. The control method as claimed in claim 20, further comprising:
adjusting the gain value of the signal generator according to the back electromotive force of the LRA.

* * * * *